July 12, 1938.	G. F. DRAKE	2,123,182
MOTOR CONTROL
Filed March 23, 1934
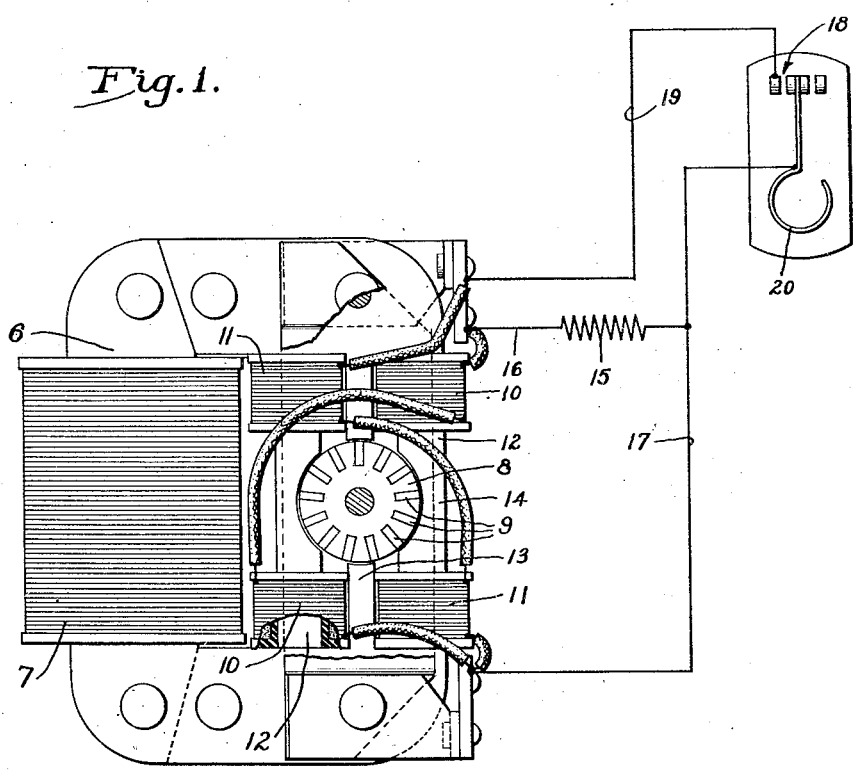
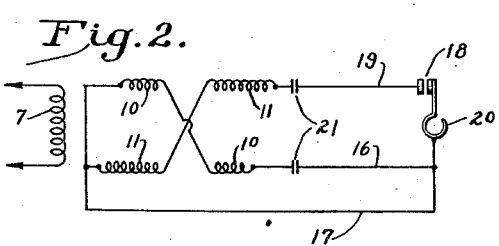
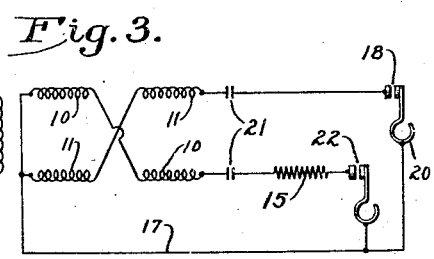
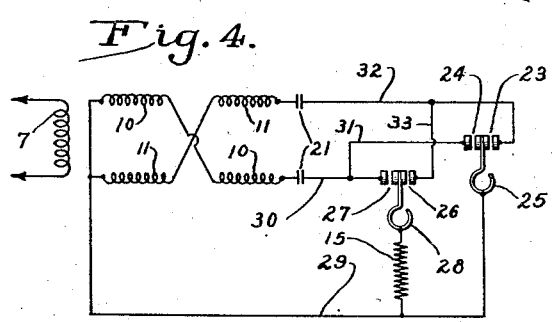
INVENTOR
*George Forrest Drake*
BY
ATTORNEYS Patented July 12, 1938

2,123,182

UNITED STATES PATENT OFFICE 2,123,182

MOTOR CONTROL

George Forrest Drake, Rockford, Ill., assignor to Howard D. Colman, Rockford, Ill.

Application March 23, 1934, Serial No. 716,927

10 Claims. (Cl. 172—278)

This invention relates to the control of reversible electric motors and the primary object is to provide a novel system by which the direction of rotation of an electric motor may be reversed by opening and closing a single switch directly controlling the motor control circuits.

The invention also resides in the novel character of the means employed in carrying out the foregoing object.

Another object is to provide a novel motor control of the above character which is especially adapted to be governed by a sensitive automatic instrumentality such as a thermostat.

Other objects and advantages of the invention will become apparent from the following detailed description taken in connection with the accompanying drawing, in which Figure 1 is an enlarged elevational view partially in section of an electric motor and a control therefor embodying the features of the present invention.

Figs. 2, 3, and 4 are wiring diagrams illustrating modifications of and alternative ways of utilizing the invention.

As an example of a motor adapted to be controlled in accordance with the present invention, I have shown in the drawing a reversible motor of the so-called shaded pole induction type which includes a field member 6 of the core type having a main winding 7 to be energized by alternating current and providing two polar projections defining a cylindrical recess in which is disposed a rotor 8 of the squirrel-cage type. The induction bars 9 are left exposed at the rotor periphery thereby contributing to the low reactance of the rotor and poor single phase characteristics of the motor.

Shifting of the magnetic field around the rotor recess in one direction or the other to initiate and maintain rotation of the rotor in corresponding directions is produced by the well known action of shading or short-circuited coils 10 and 11 enclosing side portions 12 of the pole pieces preferably leaving intermediate portions 13 of the pole pieces unenclosed. The coils on corresponding side portions of the respective poles are connected in series relation and each coil is composed of a relatively large number, approximately 500 turns of No. 34 standard gauge wire in the present instance, so that the external resistance of the means by which the coils are controlled is a small part of that of the shading coils and does not therefore materially affect the motor operation. For the purpose of properly distributing the magnetic field for effective utilization in the rotor, the adjacent side tips of the different poles are joined by magnetic extensions 14 of narrow radial width having internal surfaces closely following the rotor surface.

With the shading coils thus arranged, the magnetic field threading the coils when they are short-circuited with the winding 7 excited will induce currents in these coils which currents react with the main field flux in a well known manner to produce a lagging of the flux entering the rotor from the portions of the poles enclosed by the short-circuited coils relative to the unshaded flux entering the rotor from the remaining portions of the poles. Thus, when the coils 10 are short-circuited and the coils 11 are ineffectual, the magnetic field shifts around the rotor in a clockwise direction causing the rotor to turn in this direction. Similarly, counter-clockwise rotation occurs when the coils 11 are effectively short-circuited.

It will be observed that the motor above described may be operated in either direction by selectively controlling the two windings 10 and 11. The present invention contemplates an arrangement of the control circuits of the two starting windings in a manner such that one or the other may be rendered effective selectively by means of a single switch. For this purpose, the circuit for one of the windings is constructed to possess electrical characteristics different from the other circuit whereby the motor will run in one direction when one winding is effective and in the opposite direction under the predominating effect of the other winding when both of the windings are effective.

For the sake of simplicity, it is preferred to vary the relative resistances of the circuits for the two windings, for example by interposing a separate resistance element 15 in series with the coils 10, the value of the resistance being such that the motor will run in a clockwise direction when the coils 10 alone are short-circuited through the resistance and in the reverse direction under the predominating shading effect of the coils 11 when both sets of coils are short-circuited. As shown in Fig. 1, the resistance element 15 is connected directly to the terminals of the shading coils 10 by conductors 16 and 17, the latter being common to one terminal of the coils 11. The conductor 17 extends to one terminal of a control switch 18, the other terminal of which is connected by a conductor 19 to the insulated terminal of the coils 11. This switch may be actuated by a sensitive automatic instrumentality such as a thermostatic element 20. The shading coils 10 may thus be short-circuited permanently through the resistance 15 and the circuit through the coils 11 is controlled by the switch 18. When the switch is open, the coils 10 will be effective to produce clockwise rotation of the rotor while, when the switch is closed, the coils 11 will, owing to the lower resistance of their circuits, produce a predominating shading effect causing counter-clockwise rotation.

Preferably, the value of the resistance element 15 is such that the motor will develop substantially the same torque in both directions of rotation. For any given motor, this value is determined by the characteristics of the motor and the external resistance of the control circuits.

If desired, the relative effectiveness of the control windings may be varied in other ways. For example, the resistance of one of the circuits may be increased by decreasing the size of wire from which the coils therein are wound. Or as illustrated in Fig. 2, the coils 10 may have a smaller number of turns than the coils 11 although the resistances of the two circuits may be the same.

The control arrangement above described is especially advantageous in increasing the sensitivity of control in systems where the controlling instrumentality is a thermostat, hygrostat or the like. With the present control, it is only necessary for the sensitive element to move through a short distance or accumulate a small amount of energy in order to reverse the motor owing to the use of the single control switch. Moreover, the burden on the control switch is reduced and the service life thereof prolonged by utilizing the control in conjunction with a shaded pole motor of the character above described wherein the power consumed in the circuits by which the motor is controlled is only a small part, about one twentieth in the present instance, of the total power input of the motor. For many of these applications, it is desirable to interpose limit switches 21 in the shading coil circuits, these being operated mechanically and respectively arranged to be opened at opposite limits in the movement of the device actuated by the motor.

Fig. 3 illustrates an application of the present system of control wherein the circuit through the shading coils 11 is controlled by the thermostatic switch 18 and that through the coils 10 is governed by an independently operable thermostatic switch 22. With this arrangement, the switch 22 controls the operation of the motor in one direction only while the switch 18 governs both directions of rotation. The rotation in one direction under the control of the switch 18 is, however, dependent upon the switch 22 being closed so that the latter switch, when open, prevents operation of the motor in one direction under the control of the switch 18.

For some applications, it is desirable to provide for transferring the resistance element from one shading coil circuit to the other whereby to vary the control by auxiliary control switches. An arrangement for this purpose is shown in Fig. 4 wherein two switches 23 and 24 are arranged to be controlled by the common arm of a thermostatic element 25 and switches 26 and 27 are similarly arranged for actuation by an independent thermostatic element 28. A conductor 29 leads to the common contacts of both sets of switches, directly in one case and indirectly through the medium of the resistance element 15 in the case of the switches 26 and 27. One insulated contact of the switch 27 is connected by a conductor 30 to the shading coils 10 and by a conductor 31 to the insulated contact of the switch 24. The switch 23 is connected to the coils 11 by a conductor 32 which is joined to a conductor 33 leading to the switch 26.

With the arrangement last described, it will be observed that when the switch 27 is closed and the resistance 15 included in the circuit of the coils 10, the motor is under the control of the switch 23 and will run in one direction when the switch is closed to short-circuit the coils 11 and in the opposite direction when the switch is open, the coils 10 then being effective. Rotation in the latter direction will be interrupted whenever the switch 27 is opened. Assume now that the thermostat 28 closes the switch 26 thereby interposing the resistance 15 in the circuit of the coils 11. Then the motor will be under the control of the switch 24, the shading coils 11 and 10 being effective when the switch is opened and closed respectively.

I claim as my invention:

1. The combination of a shaded pole induction motor having a main winding adapted to be energized by alternating current and a pair of shading coils respectively adapted when short-circuited with said main winding energized to cause shifting of the magnetic field around the rotor in opposite directions, a circuit for one of said coils having a control switch therein, a circuit for the other coil adapted to be closed independently of said switch, the resistance of said last mentioned circuit being greater than that of the first mentioned circuit, the ratio of the circuit resistances being such that the shading effect of said last mentioned coil will cause said rotor to turn in one direction when said switch is open and the predominating shading effect of said first mentioned coil will initiate reverse rotation when both of said circuits are closed whereby to render the motor reversible by opening and closure of said switch.

2. The combination of a shaded pole induction motor having a main winding adapted to be energized by alternating current and a pair of shading coils respectively adapted to cause shifting of the magnetic field around the rotor in the opposite direction, the resistance of one of the shading coil circuits being substantially greater than the other whereby to cause rotation of the motor armature in one direction when the circuit of higher resistance is closed and in the other direction under the predominating shading effect of the other coil when both of the coils are effective.

3. The combination of a shaded pole induction motor having a main winding adapted to be energized by alternating current, a pair of shading coils each comprising a plurality of turns and respectively adapted when short-circuited to cause shifting of the magnetic field around the rotor in opposite directions, and selectively operable means by which the resistance of the circuit through either of said coils may be increased substantially relative to that of the circuit through the other coil whereby said motor will operate in one direction under the predominating shading effect of one of said coils when both of said circuits are closed.

4. The combination of a shaded pole induction motor having a main winding adapted to be energized by alternating current, a pair of shading coils each comprising a plurality of turns and respectively adapted when short-circuited to cause shifting of the magnetic field around the rotor in opposite directions, the circuit through one of said shading coils being of substantially higher resistance than the circuit through the other coil, and means by which said high resistance circuit or both of said circuits may be closed selectively.

5. A reversible single phase alternating current motor having poles, one of which is divided into two pole sections, a shading means on one of said pole sections of sufficient shading capacity to produce phase splitting causing rotation of the motor in one direction, and a normally open circuited shading means on the other section of the same pole having sufficiently larger shading capacity to act in conjunction with the first named shaded pole section but in opposition to the first named shading means to produce reverse phase splitting and cause the motor to rotate in a reverse direction when the circuit of the last named shading means is closed.

6. The combination of a reversible shaded pole induction motor having a stator, a rotor, a primary winding on the stator, and two shading means respectively tending when energized to effect rotation of the rotor in opposite directions, and a control circuit having a movable controlling element, one of said shading means being effective upon a movement of said element to exert a sufficiently greater shading effect than the other shading means to cause rotation of the rotor in one direction with both of said shading means energized.

7. The combination of a reversible shaded pole motor having a rotor, a stator having a primary winding, and two shading means on said stator adapted when energized to cause phase splitting tending to produce rotation of the rotor in opposite directions, and means controlling at least one of said shading means so as to effect rotation of the rotor in one direction with both of said shading means energized and acting in opposition to each other.

8. The combination of a reversible shaded pole motor comprising a rotor, a stator having a primary winding, and two shading means adapted to cause rotation of the rotor in opposite directions, at least one of said shading means having a controllable external circuit by which the relative shading effects of the two shading means may be varied, and means controlling said circuit to cause one of said shading means to exert a predominating effect over the other to cause rotation of the rotor in one direction when both shading means are energized.

9. A reversible shaded pole motor comprising a rotor, a stator having a primary winding, and two shading means on the stator adapted when energized to cause phase splitting tending to produce rotation of the rotor in opposite directions, at least one of said shading means comprising a multiple turn coil, means externally of said coil controlling the circuit thereof to vary the relative shading effects of the two shading means for producing rotation of the rotor in either direction, both of said shading means being adapted to be energized simultaneously with one of said means exerting a predominating effect over the other to cause rotation of the rotor in one of said directions.

10. A reversible shaded pole motor comprising a rotor, a stator having a primary winding, two shading means on the stator adapted to cause phase splitting tending to produce rotation of the rotor in opposite directions, and selectively operable means controlling at least one of said shading means to cause rotation of the rotor in one direction with a predetermined torque or to cause both of said shading means to be energized simultaneously with one of the shading means exerting a predominating effect over the other so as to induce rotation of the rotor in the opposite direction with a torque approximately equal to said first mentioned torque.

GEORGE FORREST DRAKE.